United States Patent
Lee et al.

(10) Patent No.: US 9,887,030 B2
(45) Date of Patent: Feb. 6, 2018

(54) WIRELESS POWER RECEIVER, TERMINAL AND WIRELESS POWER TRANSMITTER

(71) Applicant: LG INNOTEK CO., LTD., Seoul (KR)

(72) Inventors: Dong Hyuk Lee, Seoul (KR); Ji Yeon Song, Seoul (KR)

(73) Assignee: LG INNOTEK CO., LTD, Seoul (KR)

(*) Notice: Subject to any disclaimer, the term of this patent is extended or adjusted under 35 U.S.C. 154(b) by 345 days.

(21) Appl. No.: 14/605,627

(22) Filed: Jan. 26, 2015

(65) Prior Publication Data

US 2015/0213933 A1    Jul. 30, 2015

(30) Foreign Application Priority Data

Jan. 28, 2014  (KR) .................. 10-2014-0010739

(51) Int. Cl.
| | |
|---|---|
| *H01F 38/14* | (2006.01) |
| *H02J 5/00* | (2016.01) |
| *H02J 7/02* | (2016.01) |
| *H01F 7/02* | (2006.01) |
| *H02J 50/90* | (2016.01) |
| *H02J 50/12* | (2016.01) |

(52) U.S. Cl.
CPC ......... *H01F 7/0231* (2013.01); *H01F 7/0252* (2013.01); *H01F 38/14* (2013.01); *H02J 5/005* (2013.01); *H02J 7/025* (2013.01); *H02J 50/12* (2016.02); *H02J 50/90* (2016.02)

(58) Field of Classification Search
CPC . H01F 38/14; H02J 5/005; H02J 7/025; H02J 17/00; H02J 50/10; H02J 50/12; H02J 50/90
USPC ................. 307/104; 320/108, 137
See application file for complete search history.

(56) References Cited

U.S. PATENT DOCUMENTS

| | | | | |
|---|---|---|---|---|
| 4,529,898 A * | 7/1985 | Voloshin | .................. | G01V 1/02 |
| | | | | 310/15 |
| 4,656,449 A * | 4/1987 | Mallard | ..................... | H01F 3/02 |
| | | | | 324/318 |
| 4,942,352 A * | 7/1990 | Sano | ....................... | H01F 38/14 |
| | | | | 320/134 |
| 8,525,688 B2 * | 9/2013 | Chatterjee | .......... | G08B 13/1409 |
| | | | | 340/545.3 |
| 9,537,353 B1 * | 1/2017 | Bossetti | ................. | H02J 17/00 |
| 2007/0182367 A1 | 8/2007 | Partovi | | |

(Continued)

FOREIGN PATENT DOCUMENTS

| | | | |
|---|---|---|---|
| JP | H09-308146 | | 11/1997 |
| JP | H09-308146 A | | 11/1997 |

(Continued)

OTHER PUBLICATIONS

Japanese Office Action dated Nov. 18, 2015 issued in Application No. 2015-013555.

(Continued)

*Primary Examiner* — Levi Gannon
(74) *Attorney, Agent, or Firm* — KED & Associates, LLP

(57) ABSTRACT

A wireless power receiver includes a coil to receive the power; and a magnet to generate an intensity of a magnetic flux density sensed by a sensor of the wireless power transmitter. The coil has an empty central region. The magnet is disposed in the empty central region of the coil. The magnet includes an electric steel sheet.

16 Claims, 10 Drawing Sheets

(56) References Cited

U.S. PATENT DOCUMENTS

| | | | |
|---|---|---|---|
| 2009/0015210 A1 | 1/2009 | Kojima | |
| 2009/0309440 A1* | 12/2009 | Lieberman | H02N 15/00 310/90.5 |
| 2010/0013432 A1 | 1/2010 | Toya et al. | |
| 2012/0032632 A1* | 2/2012 | Soar | H01F 38/14 320/108 |
| 2012/0052923 A1 | 3/2012 | Park | |
| 2012/0112552 A1 | 5/2012 | Baarman et al. | 307/104 |
| 2012/0319647 A1 | 12/2012 | Itabashi et al. | |
| 2013/0062960 A1* | 3/2013 | Rofe | H02J 5/005 307/104 |
| 2013/0241304 A1 | 9/2013 | Bae | |
| 2013/0249302 A1 | 9/2013 | An et al. | |
| 2014/0379047 A1* | 12/2014 | Meskens | H02J 5/005 607/57 |
| 2015/0054355 A1* | 2/2015 | Ben-Shalom | H04B 5/0037 307/104 |
| 2015/0303699 A1* | 10/2015 | Wagman | H02J 50/10 307/104 |
| 2015/0326057 A1 | 11/2015 | Koyanagi et al. | |

FOREIGN PATENT DOCUMENTS

| | | |
|---|---|---|
| JP | H11-195545 | 7/1999 |
| JP | 2001-181803 A | 7/2001 |
| JP | 2006-353094 | 12/2006 |
| JP | 2006-353094 A | 12/2006 |
| JP | 2007-204787 | 8/2007 |
| JP | 2007-204787 A | 8/2007 |
| JP | 2009-022122 A | 1/2009 |
| JP | 2010-028969 A | 2/2010 |
| JP | 2011-096569 | 5/2011 |
| JP | 2011-259513 | 12/2011 |
| JP | 2011-259513 A | 12/2011 |
| JP | 2012-078321 | 4/2012 |
| JP | 2012-095456 A | 5/2012 |
| JP | 2012-0095456 | 10/2013 |
| JP | 2013-201415 | 10/2013 |
| JP | 2013-201415 A | 10/2013 |
| JP | 2014-011853 | 1/2014 |
| JP | 2014-011853 A | 1/2014 |
| KR | 10-0836631 B1 | 6/2008 |
| KR | 10-2012-0100217 A | 9/2012 |
| KR | 10-2013-0076067 A | 7/2013 |
| KR | 10-2014-0068492 A | 6/2014 |
| WO | WO 2011/096569 A1 | 8/2011 |
| WO | WO 2013/014878 A1 | 1/2013 |

OTHER PUBLICATIONS

Japanese Office Action dated Jun. 28, 2016 issued in Application No. 2015-013555.

European Search Report dated May 20, 2015 issued in Application No. 15152795.9.

Korean Office Action dated Jul. 1, 2015 issued in Application No. 10-2014-0010739.

\* cited by examiner

WIRELESS POWER RECEIVER, TERMINAL AND WIRELESS POWER TRANSMITTER

CROSS-REFERENCE TO RELATED APPLICATIONS

This application claims priority under 35 U.S.C. § 119 to Korean Application No. 10-2014-0010739 filed on Jan. 28, 2014, whose entire disclosure is hereby incorporated by reference.

BACKGROUND

1. Field

The embodiment relates to a wireless power transmission technique.

2. Background

A wireless power transmission or a wireless energy transfer refers to a technology of wirelessly transferring electric energy to desired devices. In the 1800's, an electric motor or a transformer employing the principle of electromagnetic induction has been extensively used and then a method for transmitting electrical energy by irradiating electromagnetic waves, such as radio waves or lasers, has been suggested. Actually, electrical toothbrushes or electrical razors, which are frequently used in daily life, are charged based on the principle of electromagnetic induction. The electromagnetic induction refers to a phenomenon in which voltage is induced so that current flows when a magnetic field is varied around a conductor. Although the commercialization of the electromagnetic induction technology has been rapidly progressed around small-size devices, the power transmission distance is short.

Until now, wireless energy transmission schemes include a remote telecommunication technology based on resonance and a short wave radio frequency in addition to the electromagnetic induction.

Recently, among wireless power transmission technologies, an energy transmitting scheme employing resonance has been widely used.

In a wireless power transmission system employing resonance, since power is transferred through coils of the wireless power transmitter and the wireless power receiver is wirelessly transferred through coils, a user may easily charge electronic appliances such as a portable device.

The wireless power receiver is provided with a magnet such that the wireless power transmitter senses the wireless power receiver. The wireless power transmitter senses a magnetic field by the magnet of the wireless power receiver and determines whether to charge the wireless power receiver.

However, in the related art, the magnet of a wireless power receiver has been formed of rare earth elements and the rare-earth magnet is very expensive, so that the cost of manufacturing the wireless power receiver is increased.

In addition, the magnet of a wireless power receiver according to the related art does not meet the arrangement requirements required by the standard.

BRIEF DESCRIPTION OF THE DRAWINGS

The embodiments will be described in detail with reference to the following drawings in which like reference numerals refer to like elements wherein.

DETAILED DESCRIPTION

In the description of the embodiments, it will be understood that, when a constituent element is referred to as being "on" or "under" another constituent element, it can be "directly" or "indirectly" on the other constituent element, or one or more intervening elements may also be present. In addition, the terminology of 'on (above)' and 'under (below)' may include both the meanings of 'upward' and 'downward' based on one constituent element.

Figure 1:
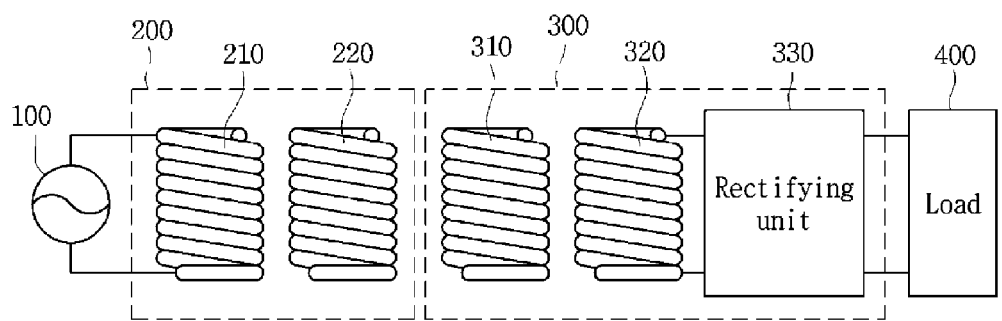
FIG. 1 is a view illustrating a wireless power transmission system according to an embodiment.

FIG. 1 is a view illustrating a wireless power transmission system according to an embodiment.

Referring to FIG. 1, the wireless power transmission system according to an embodiment may include a power source 100, a wireless power transmitter 200, a wireless power receiver 300 and a load 400.

According to one embodiment, the power source 100 may be included in the wireless power transmitter 200, but the embodiment is not limited thereto.

The wireless power transmitter 200 may include a transmission induction coil 210 and a transmission resonant coil 220.

The wireless power receiver 300 may include a reception resonant coil 310, a reception induction coil 320 and a rectifying unit 330.

Both terminals of the power source 100 are connected to both terminals of the transmission induction coil 210.

The transmission resonant coil 220 may be spaced apart from the transmission induction coil 210 by a predetermined distance.

The reception resonant coil 310 may be spaced apart from the reception induction coil 320 by a predetermined distance.

Both terminals of the reception induction coil 320 are connected to both terminals of the rectifying unit 330, and the load 400 is connected to both terminals of the rectifying unit 330. According to one embodiment, the load 400 may be included in the wireless power receiver 300.

The power generated from the power source 100 is transmitted to the wireless power transmitter 200. The power received in the wireless power transmitter 200 is transmitted to the wireless power receiver 300 that makes resonance with the wireless power transmitter 200 due to a resonance phenomenon, that is, has the resonance frequency the same as that of the wireless power transmitter 200.

Hereinafter, the power transmission process will be described in more detail.

The power source 100 may generate AC power having a predetermined frequency and transfer the AC power to the wireless power transmitter 200.

The transmission induction coil 210 and the transmission resonant coil 220 are inductively coupled to each other. In other words, if AC current flows through the transmission induction coil 210 due to the AC power received from the power supply apparatus 100, the AC current is induced to the transmission resonant coil 220 physically spaced apart from the transmission induction coil 210 due to the electromagnetic induction.

Thereafter, the power received in the transmission resonant coil 220 is transmitted to the wireless power receiver 300, which makes a resonance circuit with the wireless power transmitter 200, through resonance.

Power can be transmitted between two LC circuits, which are impedance-matched with each other through resonance. The power transmitted through the resonance can be farther transmitted with higher efficiency when comparing with the power transmitted by the electromagnetic induction.

The reception resonant coil 310 may receive power from the transmission resonant coil 220 through the frequency resonance. The AC current may flow through the reception resonant coil 310 due to the received power. The power received in the reception resonant coil 310 may be transmitted to the reception induction coil 320, which is inductively coupled to the reception resonant coil 310, due to the electromagnetic induction. The power received in the reception induction coil 320 is rectified by the rectifying circuit 330 and transmitted to the load 400.

According to one embodiment, the transmission induction coil 210, the transmission resonant coil 220, the reception resonant coil 310, and the reception induction coil 320 may have a spiral structure in a plane spiral shape or a helical structure in a three-dimensional spiral shape, but the embodiment is not limited thereto.

When the transmission resonant coil 220 transmits power to the reception coil 340 by using a resonance scheme, the transmission resonant coil 220 and the reception resonant coil 310 are resonantly coupled with each other to be operated in the resonant frequency band.

Since the transmission resonant coil 220 is resonantly coupled with the reception resonant coil 310, the power transmission efficiency between the wireless power transmitter 200 and the wireless power receiver 300 may be significantly improved As described above, the wireless power transmission system which transmits power in a resonant frequency scheme has been described.

The embodiment may be applied to power transmission of an electromagnetic induction scheme as well as a resonant frequency scheme.

That is, according to an embodiment, when the wireless power transmission system transmits power based on electromagnetic induction, the transmission resonant coil 220 included in the wireless power transmitter 200 and the reception resonant coil 310 included in the wireless power receiver 300 may be omitted.

A quality factor and a coupling coefficient are important in the wireless power transmission. That is, the power transmission efficiency may be proportional to each of the quality factor and the coupling coefficient. Thus, as at least one of the quality factor and the coupling coefficient is increased, the power transmission efficiency may be improved.

The quality factor may refer to an index of energy that may be stored in the vicinity of the wireless power transmitter 200 or the wireless power receiver 300.

The quality factor may vary according to the operating frequency ω as well as a shape, a dimension and a material of a coil. The quality factor may be expressed as following equation 1:

$$Q=w*L/R \quad \text{[Equation 1]}$$

Where L refers to the inductance of a coil and R refers to resistance corresponding to the quantity of power loss caused in the coil.

The quality factor may have a value of 0 to infinity. When the quality factor has a greater value, the power transmission efficiency between the wireless power transmitter 200 and the wireless power receiver 300 may be more improved.

The coupling coefficient represents the degree of inductive magnetic coupling between a transmission coil and a reception coil, and has a value of 0 to 1.

The coupling coefficient may vary according to the relative position and the distance between the transmission coil and the reception coil.

Figure 2:
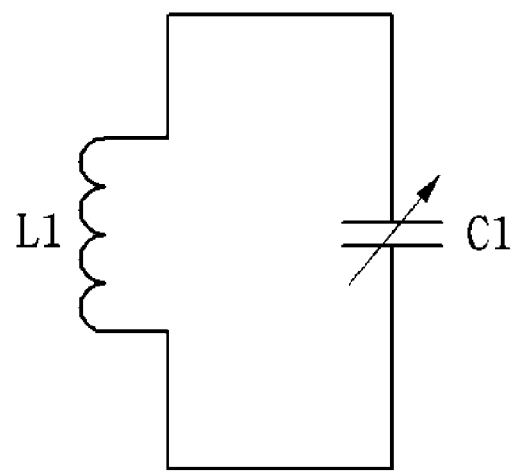
FIG. 2 is an equivalent circuit diagram of a transmission induction coil according to an embodiment.

FIG. 2 is an equivalent circuit diagram of the transmission induction coil according to an embodiment.

As shown in FIG. 2, the transmission induction coil 210 may include an inductor L1 and a capacitor C1, and a circuit having a desirable inductance and a desirable capacitance can be constructed by the inductor L1 and the capacitor C1.

The transmission induction coil 210 may be constructed as an equivalent circuit in which both terminals of the inductor L1 are connected to both terminals of the capacitor C1. In other words, the transmission induction coil 210 may be constructed as an equivalent circuit in which the inductor L1 is connected in parallel to the capacitor C1.

The capacitor C1 may include a variable capacitor, and impedance matching may be performed by adjusting the capacitance of the capacitor C1. The equivalent circuits of the transmission resonant coil 220, the reception resonant coil 310 and the reception induction coil 320 may be equal or similar to the circuit shown in FIG. 2, but the embodiment is not limited thereto.

Figure 3:
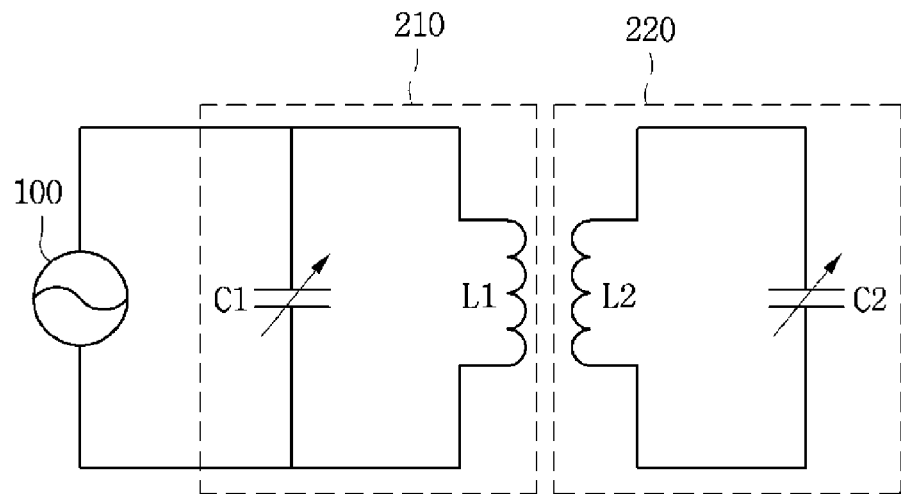
FIG. 3 is an equivalent circuit diagram of a power source and a wireless power transmitter according to an embodiment.

FIG. 3 is an equivalent circuit diagram of the power source and the wireless power transmitter according to an embodiment.

As shown in FIG. 3, the transmission induction coil 210 and the transmission resonant coil 220 may be constructed by using inductors L1 and L2 and capacitors C1 and C2 having predetermined inductances and capacitances, respectively.

Figure 4:
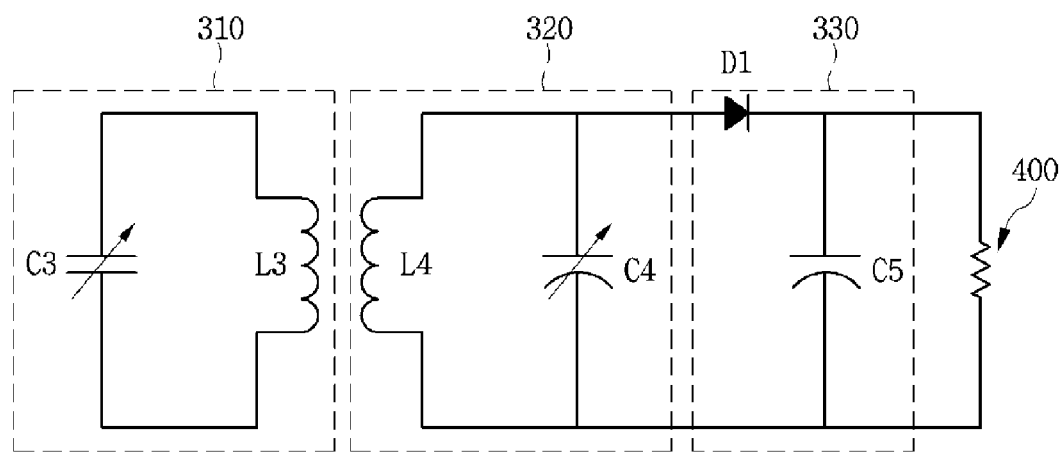
FIG. 4 is an equivalent circuit diagram of a wireless power receiver according to an embodiment.

FIG. 4 is an equivalent circuit diagram of the wireless power receiver according to an embodiment.

As shown in FIG. 4, the reception resonant coil 310 and the reception induction coil 320 may be constructed by using inductors L3 and L4, and capacitors C3 and C4 having predetermined inductances and capacitances, respectively.

The rectifying circuit 330 may convert AC power transferred from the reception induction coil 320 into DC power and may transfer the DC power to the load 400.

In detail, although not shown, the rectifying circuit 330 may include a rectifier and a smoothing circuit. According to the embodiment, the rectifying circuit may include a silicon rectifier and as shown in FIG. 4, may be equivalent to a diode D1, but the embodiment is not limited thereto.

The rectifier may convert AC power transferred from the reception induction coil 320 into DC power.

The smoothing circuit may remove AC components included in the DC power converted by the rectifier to output a smoothed DC power. According to an embodiment, as shown in FIG. 4, a rectifying capacitor C5 may be used as the smoothing circuit, but the embodiment is not limited thereto.

The DC power transferred from the rectifying circuit 330 may be DC voltage or current, but the embodiment is not limited thereto.

The load 400 may be an arbitrary rechargeable battery or a device requiring the DC power. For example, the load 400 may refer to a battery.

The wireless power receiver 300 may be installed to an electronic appliance such as a portable phone, a laptop computer or a mouse requiring electric power. Thus, the reception resonant coil 310 and the reception induction coil 320 may have shapes corresponding to a shape of the electronic appliance.

The wireless power transmitter 200 may exchange information with the wireless power receiver 300 through in-band or out-of-band communication.

The in-band communication may refer to the communication for exchanging information between the wireless power transmitter 200 and the wireless power receiver 300 by using a signal having a frequency used in the wireless power transmission. To this end, the wireless power receiver 300 may further include a switch and may receive the power transmitted from the wireless power transmitter 200 through a switching operation of the switch or not. Thus, the wireless power transmitter 200 detects an amount of power consumed in the wireless power transmitter 200, so that the wireless power transmitter 200 may recognize an on or off signal of the switch included therein.

In detail, the wireless power receiver 300 may change an amount of power dissipated in a resistor by using the resistor and a switch, so that the power consumed in the wireless power transmitter 200 may be changed. The wireless power transmitter 200 may sense a change of the consumed power to obtain information about a state of the load 400. The switch and the resistor may be connected in series to each other. The information about the state of the load 400 may include information about a current charged amount and/or the tendency of charged amount of the load 400. The load 400 may include the wireless power receiver 400.

In more detail, when the switch is opened, the power dissipated in the resistor is 0 (zero) and the power consumed in the wireless power transmitter 200 is also reduced.

If the switch is shorted, the power absorbed in the resistor is more than 0 and the power consumed in the wireless power transmitter 200 is increased. While the wireless power receiver repeats the above operation, the wireless power transmitter 200 may detect the power consumed in the wireless power transmitter 200 and may perform digital communication with the wireless power receiver 300.

The wireless power transmitter 200 receives the information about the state of the load 400 according to the above operation, so that the wireless power transmitter 200 may transmit the power suitable to the reception state of the load 200.

To the contrary, the wireless power transmitter 200 may include a resistor and a switch to transmit the information about the state of the wireless power transmitter 200 to the wireless power receiver 300. According to one embodiment, the information about the state of the wireless power transmitter 200 may include information about the maximum amount of power to be supplied from the wireless power transmitter 200, the number of wireless power receivers 300 receiving the power from the wireless power transmitter 200 and the amount of available power of the wireless power transmitter 200.

Hereinafter, the out-of-band communication will be described.

The out-of-band communication refers to the communication performed through a specific frequency band other than the resonance frequency band in order to exchange information necessary for the power transmission. The wireless power transmitter 200 and the wireless power receiver 300 can be equipped with out-of-band communication modules to exchange information necessary for the power transmission. The out-of-band communication module may be installed in the power supply device. In one embodiment, the out-of-band communication module may use a short-distance communication technology, such as Bluetooth, Zigbee, WLAN or NFC, but the embodiment is not limited thereto.

Figure 5:
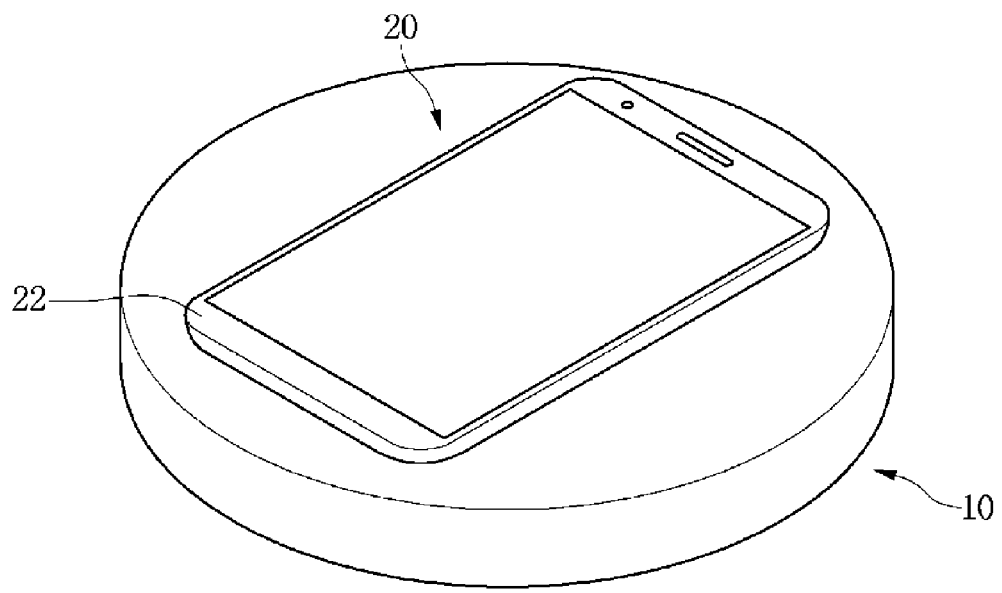
FIG. 5 is a perspective view showing a wireless power transmission system according to an embodiment.

FIG. 5 is a perspective view showing a wireless power transmission system according to an embodiment.

Referring to FIG. 5, the wireless power transmission system according to an embodiment may include a holder 10 and a terminal 20.

The holder 10 may include a power source and a wireless power transmitter as shown in FIG. 1. When viewed from the top, the holder 10 may have a circular, oval, square or rectangular shape, but the embodiment is not limited thereto.

A top surface of the holder 10 may make contact with a back surface of the terminal 20. At least part of the top surface of the holder 10 may have the same shape as that of the back surface of the terminal, but the embodiment is not limited thereto.

The transmission coil (reference numerals 210 and 220 of FIG. 1) of the wireless power transmitter embedded in the holder 10 may face the top surface of the holder 10. The transmission coil 210 and 220 may be disposed in parallel with the top surface of the holder 10 such that the power of the transmission coil 210 and 220 is uniformly transmitted to the terminal 20.

The terminal 20 may include the battery 36 and may signify all electronic appliances which are capable of performing predetermined electronic functions by using the power charged in the battery 36. For example, the terminal 20 may include a mobile appliance such as a smart phone or a tablet PC, or a home appliance such as a television, a refrigerator or a washing machine.

The terminal 20 may include the wireless power receiver and the load depicted in FIG. 1. That is, the wireless power receiver and the load may be embedded in the terminal 20.

The terminal 20 may be placed on the top surface of the holder 10 such that the terminal 10 in order to charge the terminal 20. When the terminal 20 may be placed on the top surface of the holder 10, the front cover 22 of the terminal 20 faces upward such that the rear cover 24 of the terminal 20 may make contact with the top surface of the holder 10. Thus, the power may be wirelessly provided from the holder 10 to the load so that the load may be charged.

Figure 6:
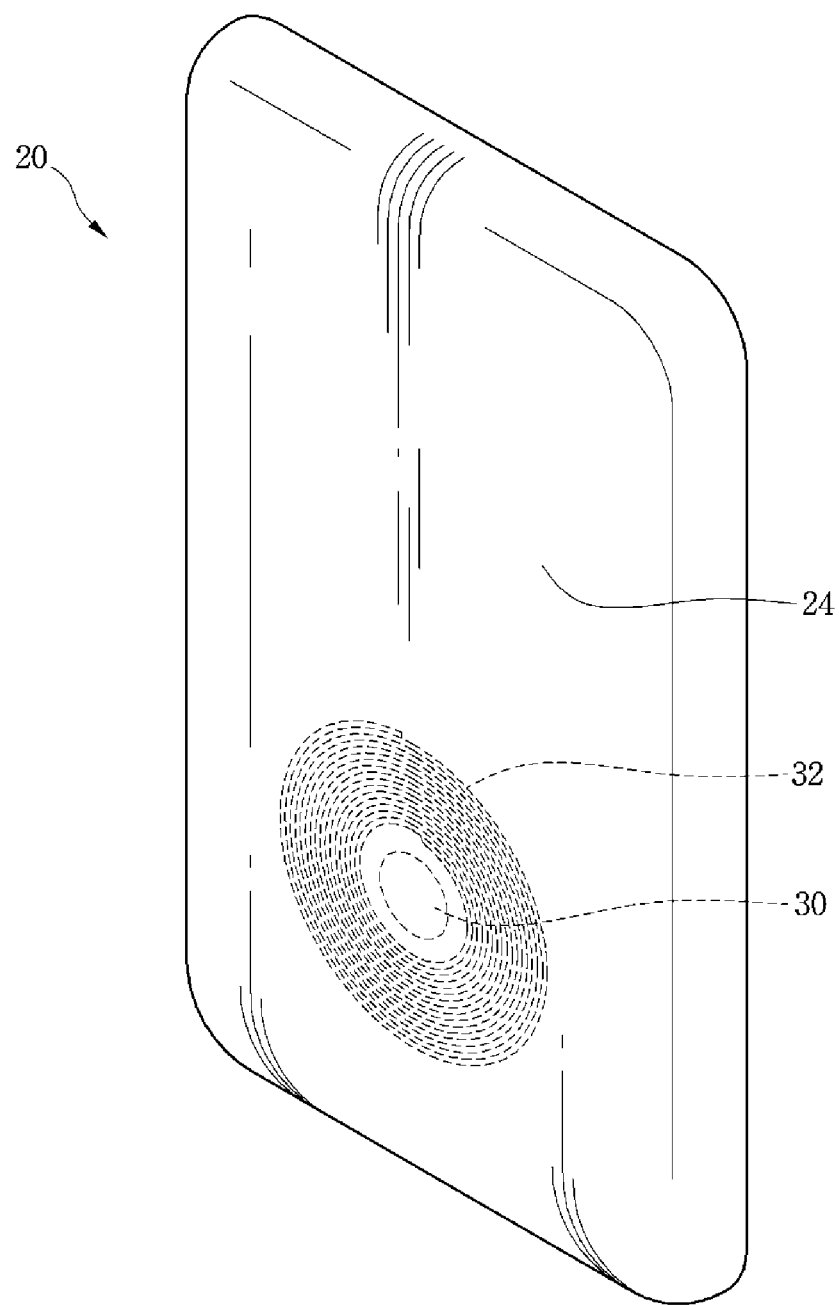
FIG. 6 is a rear view of a terminal in FIG. 5.

As shown in FIG. 6, a reception coil 32 and a magnet 30 may be disposed adjacently to the back surface of the terminal 20 corresponding to the top surface of the holder 10. In addition, the reception coil 32 may be disposed to allow the transmission coil 210 and 220 of the holder 10, the top surface of the holder 10 and the rear cover 24 of the wireless power receiver to face each other. Specifically, when the reception coil 32 of the terminal 20 is place in parallel with the transmission coil 210 and 220 of the holder 10, the efficiency of the power transferred from the transmission coil 210 and 220 of the holder 10 to the reception coil 32 of the terminal 20 may be maximized.

A wireless power transmission system according to the embodiment will be described in more detail with reference to FIG. 7.

Figure 7:
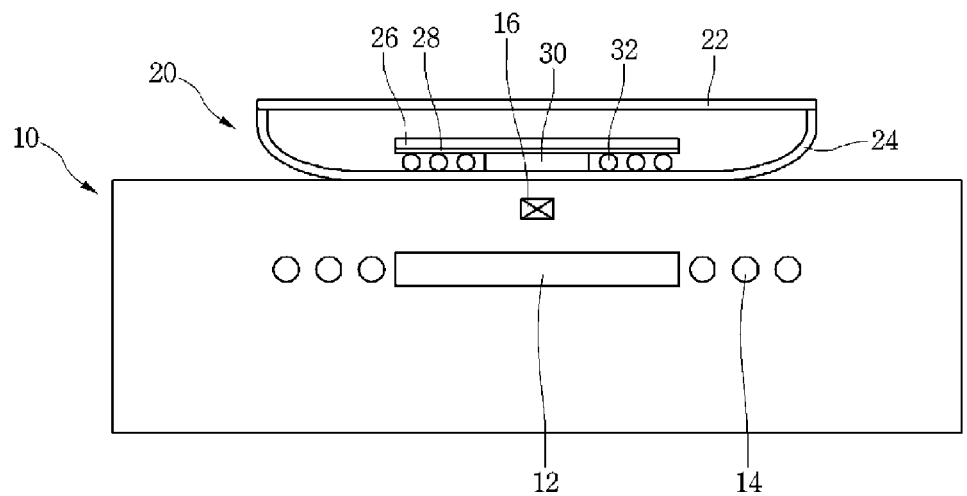
FIG. 7 is a sectional view showing a wireless power transmission system according to an embodiment.

FIG. 7 is a sectional view showing a wireless power transmission system according to the embodiment.

As shown in FIG. 7, the holder 10 may include a transmission coil 14 and a first magnet 12. The transmission coil 14 and the first magnet 12 may be disposed adjacently to the top surface of the holder 10. The transmission coil 14 and the first magnet 12 may be disposed on the same surface.

The transmission coil 14 may be the transmission induction coil and/or the transmission resonant coil depicted in FIG. 1. For example, while the transmission induction coil and the transmission resonant coil are all used in case of a resonance scheme, only the transmission induction coil may be used in case of an electromagnetic induction scheme.

The transmission coil 14 may surround the first magnet 12. The transmission coil 14 may have several numbers of turns and the adjacent transmission coils 14 may be spaced apart from each other, but the embodiment is not limited thereto. The transmission coil 14 may be disposed in parallel with a virtual horizontal plane. The central region of the transmission coil 14 having the structure described above may be empty.

The first magnet 12 may be disposed in the central region of the transmission coil 14. The thickness of the first magnet 12 may be equal to, or thicker or thinner than that of the transmission coil 14. The thickness and area of the first magnet 12 may be varied according to the intensity of magnetic flux density required to the first magnet 12 and the occupying area of the first magnet 12.

The terminal 20 may include a shielding member 26, a reception coil 32 and a second magnet 30. The reception coil 32 and the second magnet 30 may be disposed on the same surface.

The reception coil 32 may be the reception resonant coil and/or the reception induction coil depicted in FIG. 1. For example, while the reception resonant coil and the reception induction coil are all used in case of a resonance scheme, only the reception induction coil may be used in case of an electromagnetic induction scheme.

The reception coil 32 may surround the second magnet 30. The reception coil 32 may have several numbers of turns and the adjacent reception coils 32 may be spaced apart from each other. The reception coil 32 may be disposed in parallel with a virtual horizontal plane. The central region of the reception coil 32 having the structure described above may be empty.

The second magnet 30 may be disposed in the central region of the reception coil 32. The central region of the reception coil 32 may be less than that of the transmission coil 14, but the embodiment is not limited thereto. The thickness of the second magnet 30 may be equal to, or thicker or thinner than that of the reception coil 30. The thickness and area of the second magnet 30 may be varied according to the intensity of magnetic flux density required to the second magnet 30 and the occupying area of the second magnet 30.

The second magnet 30 allows the holder 10 to sense whether the terminal 20 approaches or makes contact with the holder 10.

For the purpose of such a sensing, the holder 10 may further include a hall sensor 16. The hall sensor 16 may be disposed between the top surface of the holder and the first magnet 12, but the embodiment is not limited thereto. The hall sensor 16 may be disposed more adjacently to the top surface of the holder 10 than the first magnet 12. The hall sensor 16 may be disposed in the holder 10 between the first magnet 12 of the holder 10 and the second magnet 30 of the terminal 20. The hole sensor 16 senses only the intensity of magnetic flux density of the first magnet 12 when the terminal 20 does not exist. However, when the terminal 20 approaches the holder 10, the hall sensor 16 may sense the intensity of magnetic flux density of the second magnet 30 as well as the intensity of magnetic flux density of the first magnet 12. Thus, based on the intensity of magnetic flux density of the first magnet 12 sensed when the terminal 20 does not exist, the holder 10 senses the intensities of magnetic flux densities generated from the first and second magnets 12 and 30 when the terminal 20 is placed on the holder 10. When a variation degree ($\alpha$) of the sensed magnetic flux density is greater than a threshold value, the holder 10 determines that the terminal 20 is placed on the holder 10 for charging, and then, may perform the process of charging the terminal 20.

To this end, the second magnet 30 may be formed of a material which causes the variation degree ($\alpha$) of the sensed magnetic flux density to be greater than the threshold value. For example, the threshold value may be equal to 32 G. The threshold value requested in the standard may be equal to 40 G.

The second magnet 30 may include an electrical sheet. For example, the electrical sheet may contain at least silicon (Si) in the range of 1% to 5%, but the embodiment is not limited thereto. The content of silicon of the second magnet 30 may be varied in order to cause the variation degree ($\alpha$) of the magnetic flux density to be greater than the threshold value required by a client or the standard.

For example, the reception coil 32 and the second magnet 30 may adhere to a back surface of the shielding member 26 by using adhesive 28. A printed circuit board, on which electronic components including a power source, an AC power generating unit, and a control unit are mounted, may be disposed on the shielding member 26.

The shielding member 26 may shield the magnetic field induced by the coil to prevent the magnetic field from exerting an effect on an electronic component, so that the electronic component may be prevented from being an erroneously operated.

Figure 8:
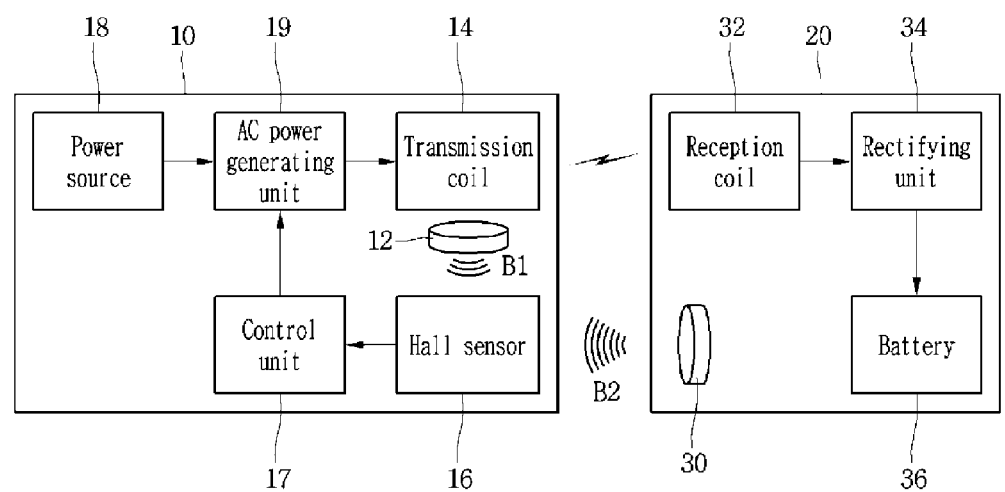
FIG. 8 a block diagram showing a wireless power transmission system according to an embodiment.

FIG. 8 is a block diagram showing a wireless power transmission system according to an embodiment.

Referring to FIGS. 5 to 8, the wireless power transmission system may include a holder 10 and a terminal 20.

Since the outer appearances of the holder 10 and the terminal 20 have been described above, the circuit configurations of the holder 10 and the terminal 10 will be described below.

The holder 10 may include a power source, an AC power generating unit 19, a control unit 17, a transmission coil 14, a first magnet 12 and a hall sensor 16.

The power source may be the same as the power source depicted in FIG. 1, and the transmission coil 14 may be the same as the transmission induction coil and/or the transmission resonant coil depicted in FIG. 1.

The power source generates AC power or DC power. The power source may convert AC power into first DC power and may convert the first DC power into second DC power.

The AC power generating unit 19 may convert the power of the power source into AC power under control of the control unit 17. The AC power converted by the AC power generating unit 19 may be transmitted to the terminal 20 through the transmission coil 14.

The control unit 17 may control the AC power generating part 19 based on the variations of the intensities of magnetic flux densities B1 and B2 sensed by the hall sensor 16.

Hereinafter, a detection of a voltage signal will be described with reference to FIG. 10.

Figure 10:
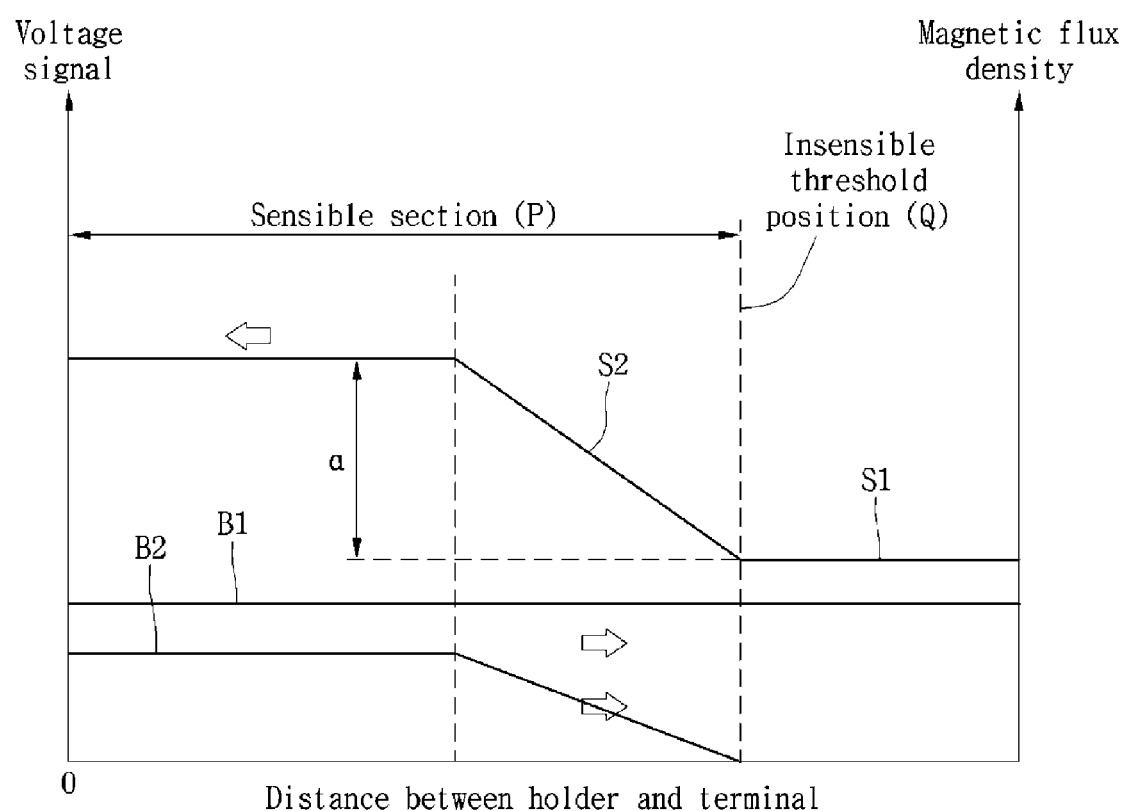
FIG. 10 is a view showing a voltage signal detected by a hall sensor according to a distance between a holder and a terminal.

As shown in FIG. 10, the hall sensor 16 may detect the intensity of the magnetic flux density B1 of the first magnet 12 included in the holder 10. When the terminal 20 is placed on the holder 10, the hall sensor 16 may detect the intensity of the magnetic flux density B2 of the second magnet 30 included in the terminal 20. Although it is depicted in the drawing that the intensity of the magnetic flux density B2 of the second magnet 30 is less than that of the magnetic flux density B1 of the first magnet 12, the intensity of the magnetic flux density B2 of the second magnet 30 is equal to or stronger than that of the magnetic flux density B1 of the first magnet 12.

The hall sensor 16 may convert the intensities of the magnetic flux densities B1 and B2 of the first and second magnets 12 and 30 into electric signals to provide the electric signals to the control unit 17. For example, the electric signal may include a voltage signal, but the embodiment is not limited thereto. For example, the magnetic flux density of 1 G may be converted into an electric signal of 5 mV. For example, when the intensity of the magnetic flux density B1 of the first magnet 12 has 10 G, the hall sensor 16 may convert the intensity of the magnetic flux density B1 of 10 G detected from the first magnet 12 into an voltage signal of 50 mV and may provide the voltage signal of 50 mV to the control unit 17.

When the terminal 20 does not exist, that is, when the terminal 20 is located at a place which is out of range to sense the intensity of the magnetic flux density B2 of the second magnet 30 by the hall sensor 16, the control unit 17 detects a first voltage signal S1 corresponding to the intensity of the magnetic flux density B1 of the first magnet 12.

When the terminal 20 moves into a sensible section P in which the hall sensor 16 of the holder 10 can sense the intensity of the magnetic flux density B2 of the second magnet 30, the hall sensor 16 may output a second voltage signal S2 corresponding to the sum of the intensities of the magnetic flux densities B1 and B2 of the first and second magnets 12 and 30.

A border point P between the distance, which is out of range to sense the intensity of the magnetic flux density B2 of the second magnet 30, and the sensible section P may be defined as an insensible threshold point P. When the distance between the terminal 20 and the holder 10 is beyond the insensible threshold point P, the hall sensor 16 may not sense the intensity of the magnetic flux density B2 of the second magnet 30. When the distance between the terminal 20 and the holder 10 is within the insensible threshold point P, that is, the sensible section P, the hall sensor 16 may sense the intensity of the magnetic flux density B2 of the second magnet 30.

The second voltage signal S2 may be linearly increased as the terminal 20 approaches the holder 10.

The second voltage signal S2 may be saturated from a position so that the second voltage signal S2 has a constant level. The intensity of the magnetic flux density B2 of the second magnet 30 is maximized at the point. Thus, the intensity of the magnetic flux density B2 of the second magnet 30 may be maintained at the maximum within a predetermined distance and may be gradually decreased as the second magnet 30 is located beyond the predetermined distance.

When the terminal 20 approaches the holder 10, so that the terminal 20 enters the area of the maximum magnetic flux density B2, the second voltage signal S2 output from the hall sensor 16 in the area is not increased any more and is maintained at a constant level. That is, since the intensity of the magnetic flux density B2 of the second magnet 30 is not increased beyond the maximum even when the terminal 20 is placed on the holder 10, the second voltage signal S2 corresponding to the sum of the intensities of the magnetic flux densities B1 and B2 of the first and second magnets 12 and 30 may be maintained at the constant level.

When the terminal 20 is placed on the holder 10 so that the distance between the terminal 20 and the holder 10 is equal to 0 (zero), the second voltage signal S2 corresponding to the intensities of the magnetic flux densities B1 and B2 of the first and second magnets 12 and 30 may be detected as the constant level. In this case, the second voltage signal S2 is greater than the first voltage signal S1.

The difference between the first and second voltage signals S1 and S2 may be defined as a variation degree ($\alpha$).

For example, when the variation degree ($\alpha$) of the first and second voltage signals S1 and S2 is greater than the predetermined threshold value, the control unit 17 determines that the terminal 20 is placed on the holder 10 and controls the AC power generating unit 19 such that Ac power is transmitted through the transmission coil 14.

The terminal 20 may include a reception coil 32, a rectifying unit 34, a battery 36 and the second magnet 30.

The reception coil 32 may be the reception resonant coil and/or the reception induction coil depicted in FIG. 1, and the battery 36 may be the load depicted in FIG. 1.

The reception coil 32 receives the AC power provided from the transmission coil 14 of the holder 10.

The rectifying unit 34 rectifies the AC power provided from the reception coil 32 to convert the AC power into DC power from which noise is removed.

The terminal 20 may include a DC-DC converting unit (not shown) which is connected between the rectifying unit 34 and the battery 36 to convert the DC power converted by the rectifying unit 34 into rated power or a rated voltage.

The terminal 20 may communicate with the holder 10 through in-band or out-of-band communication in order to provide information about the increase and decrease of the power strength required by the terminal 20 or a current charging state of the terminal 20 to the holder 10.

Although not shown, the terminal 20 may further include a managing module which senses the received AC power or the state of the battery 36 to prevent overpower from being supplied to the battery 36 and a control unit for performing the entire control.

Figure 9:
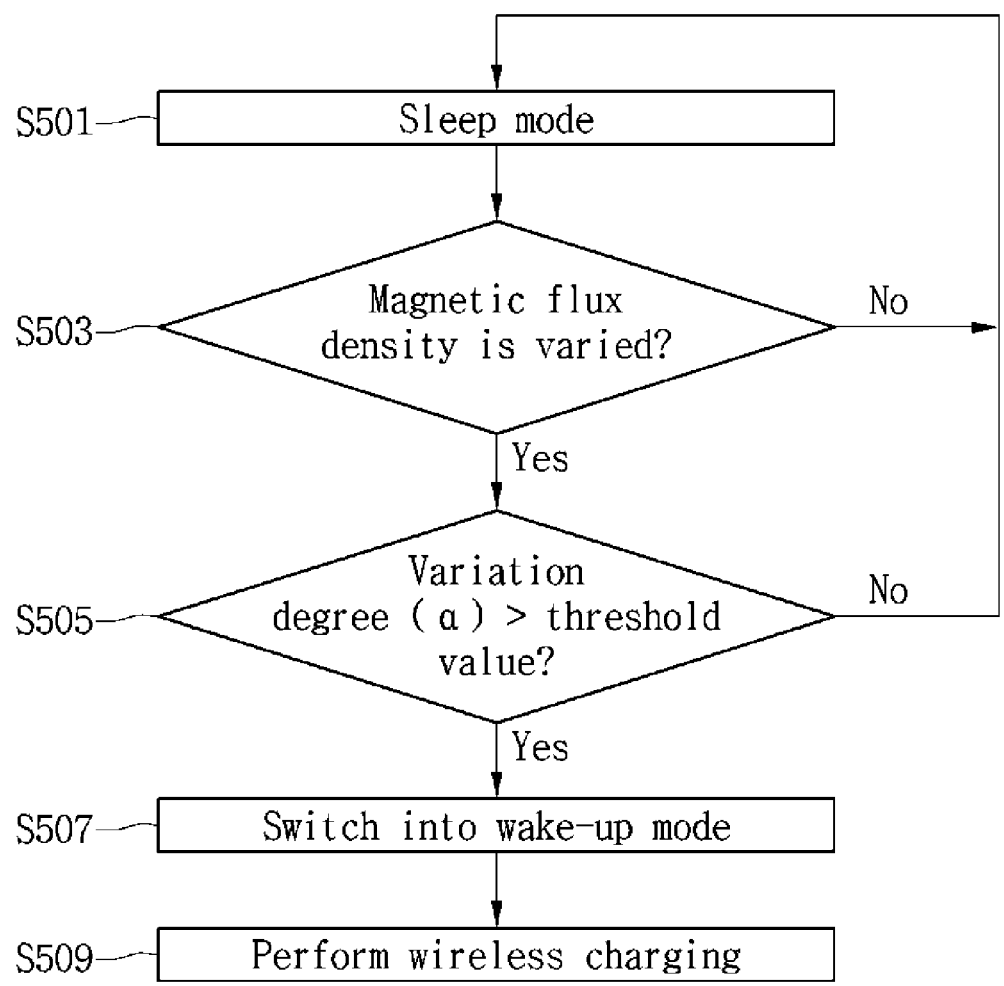
FIG. 9 is a flowchart illustrating a method of operating a wireless power transmission system according to an embodiment.

FIG. 9 is a flowchart illustrating a method of operating a wireless power transmission system according to an embodiment.

Referring to FIGS. 8 and 9, when the terminal 20 is not placed on the holder 10, the control unit 17 of the holder 10 prevents any AC power from being irradiated and is operated in a sleep mode in which only an inner essential element, for example, the hall sensor 16 is driven to minimize the current consumption.

The control unit 17 may receive the first control signal S1 corresponding to the magnetic flux density of the first magnet 12 for the hall sensor 16 as the hole sensor 16 is driven.

The control unit 17 determines whether the magnetic flux density is varied. That is, the control unit 17 determines whether the second voltage signal S2 stronger than the first voltage signal S1 is provided from the hall sensor 16. When the terminal 20 approaches the holder 10, the second voltage signal S2 output from the hall sensor 16 may be gradually increased as the terminal approaches the holder 10. The second voltage signal S2 may be a signal on which the intensity of the magnetic flux density B2 of the second magnet 30 is reflected as well as the intensity of the magnetic flux density B1 of the second magnet 12. For example, the second voltage signal S2 may be obtained by converting the sum of the intensities of the magnetic flux densities B1 and B2 of the first and second magnets 12 and 30, but the embodiment is not limited thereto.

The second voltage signal S2 may be increased from the first voltage signal S1. Thus, as shown in FIG. 10, the variation degree (α) between the first and second voltage signals S1 and S2 may be gradually increased as the terminal 20 approaches the holder 10.

The control unit 17 determines whether the variation degree (α) between the first and second voltage signals S1 and S2 is equal to or greater than the threshold value.

As the determination result, when the variation degree (α) is equal to or greater than the threshold value, the control unit 17 is switched from the sleep mode to a wake-up mode.

The wake-up mode may be an activation process for transmitting power to the terminal 20.

In the wake-up mode, the control unit 17 performs a wireless charging operation. That is, power is provided from the power source under control of the control unit 17. The AC power generating unit 19 may generate AC power based on the power of the power source and the generated AC power may be transmitted to the terminal 20 through the transmission coil 14.

Hereinafter, an optimal arrangement design structure of the second magnet 30 included in the terminal 20 according to an embodiment will be described.

Figure 11:
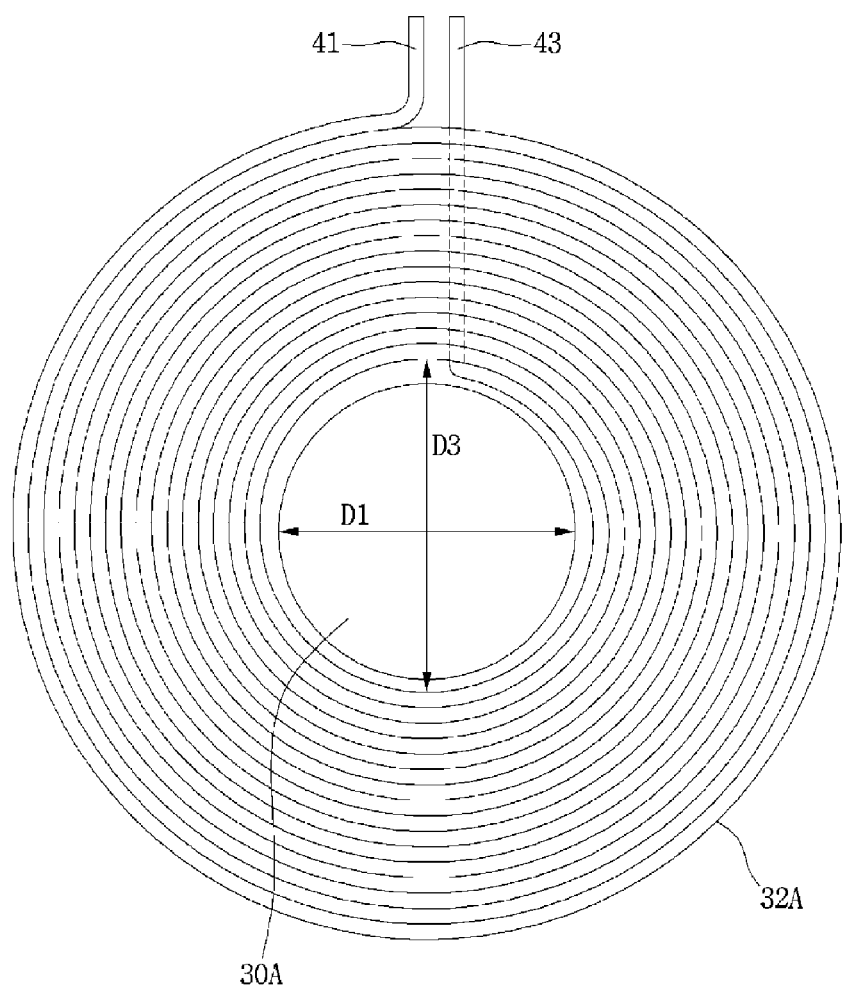
FIG. 11 is a view showing a second magnet disposed in a winding coil structure.
Figure 12:
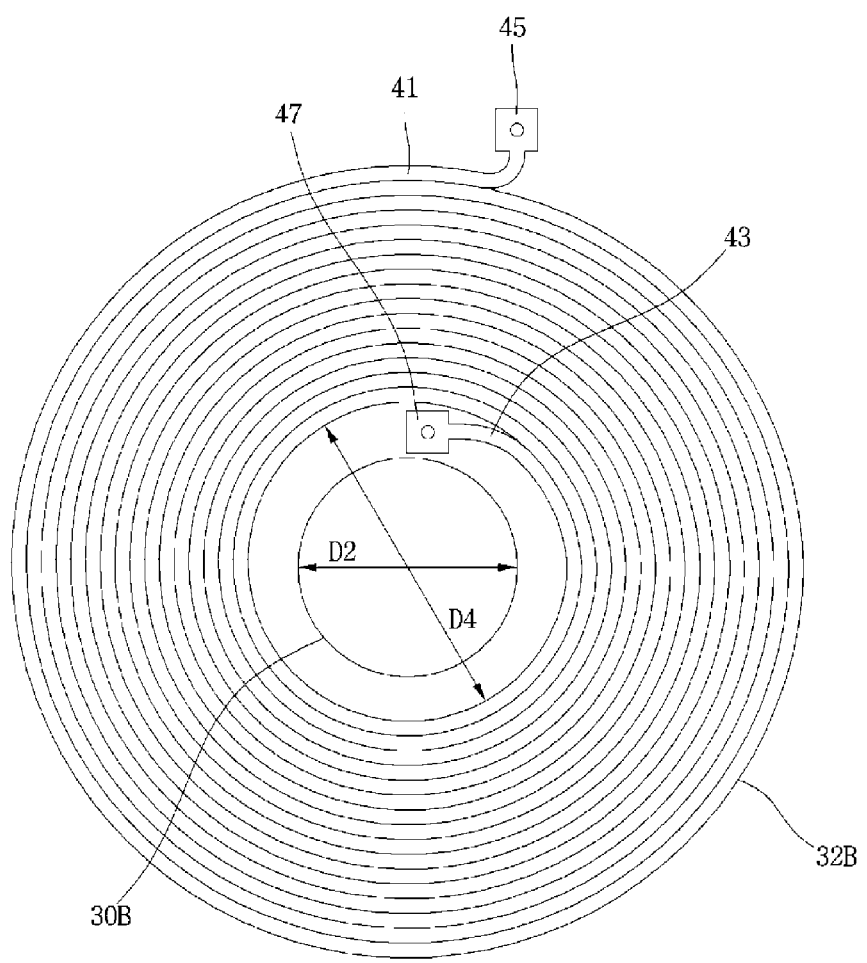
FIG. 12 is a view showing a second magnet disposed in a lead frame coil structure.

The reception coil 32 included in the terminal 20 may be classified into a winding coil structure (FIG. 11) and a lead frame coil structure (FIG. 12).

The greatest difference between the winding coil structure 32A and the lead frame coil structure 32B is whether a pad exists or not. That is, the winding coil does not have any pads, but the lead frame coil 32B includes pads 45 and 47.

After the winding coil 32A is wound by a predetermined number of turns from one end 41 thereof such that the diameter is gradually reduced, the other end of the winding coil 32A may be drawn out near the one end 41 of the winding coil 32A by crossing the coil having a number of turns.

The lead frame coil 32B may have one end 41 connected to a first pad 45 and the other end 43 connected to a second pad 47. The lead frame coil 23B may be wound by the predetermined number of turns from the one end 41 to the other end 43 such that the diameter is gradually reduced. In this case, the second pad 47 connected to the other end 43 may be disposed in the coil having a number of turns.

As described above, the central regions of the winding coil 32A and the lead frame coil 32B are empty. The second pad 47 connected to the other end 43 of the lead frame coil 32B may be disposed in the central region.

The diameter of the central region of the winding coil 32A will be referred to as D3, and the diameter the central region of the lead frame coil 32B will be referred to as D4.

Since any pads do not exist in the central region of the winding coil 32A, the second magnet 30A may have a diameter D1 approximate to the diameter D3 of the central region.

To the contrary, since the second pad 47 of the lead frame coil 32B is disposed in the central region, the second magnet 30B may have a diameter D2 less than the diameter D4 of the central region.

Thus, the diameter D1 of the second magnet 30A disposed in the central region of the winding coil 32A may be greater than the diameter D2 of the second magnet 30B in the central region of the lead frame coil 32B.

Figure 13:
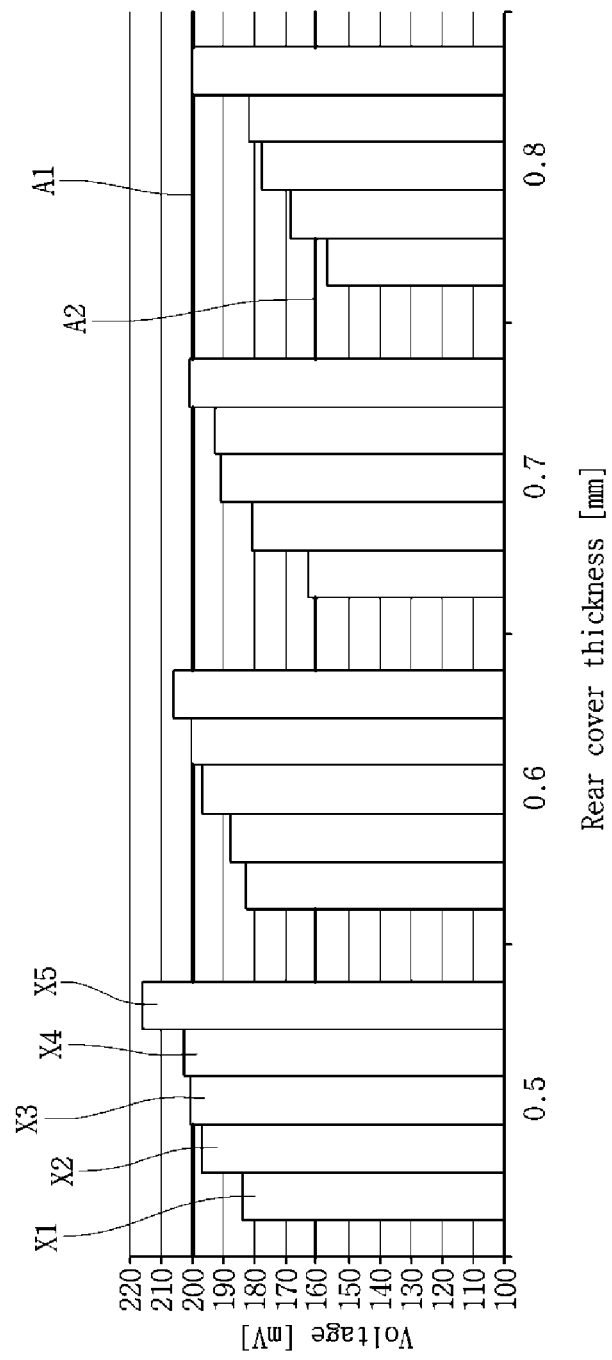
FIG. 13 is a view showing an intensity of a magnetic flux density in a lead frame coil structure.

FIG. 13 is a view showing the intensity of the magnetic flux density according to the arrangement of the second magnet in the lead frame coil structure.

For the purpose of experiment, samples proposed in table 1 were used. The thickness of the second magnet 30B was fixed at 150 mm.

TABLE 1

| Sample | Rear cover 24 Thickness [mm] | Diameter/area of second magnet 30B [mm/mm²] | Ratio of area of second magnet 30B to available area [%] |
|---|---|---|---|
| #1 | 0.5 | 8/50 | 44 |
| #2 | 0.6 | 8/50 | 44 |
| #3 | 0.7 | 8/50 | 44 |
| #4 | 0.8 | 9/64 | 56 |
| #5 | 0.5 | 11/95 | 84 |
| #6 | 0.6 | 11/95 | 84 |
| #7 | 0.7 | 12/113 | 100 |
| #8 | 0.8 | 12/113 | 100 |

In this case, the available area, in which the second magnet 30B is disposed, may be varied according to whether the pad is disposed in the central region. Since, while the second pad 47 exists in the central region in the lead frame structure, the second pad 47 does not exist in the central region in the winding frame structure, the available area in the lead frame structure may be less than that in the structure of the wilding coil 32A. In this case, when the second magnet 30B having the same diameter is disposed, the ratio of the area of the second magnet 30B to the available area in the lead frame coil structure is greater than that in the structure of the winding coil 32A.

In FIG. 13, X1 to X5 denote diameters of the second magnet 30B, where X1 is equal to 8 mm, and X2 is equal to 9 mm. In addition, X3 to X5 are equal to 10 mm, 11 mm and 12 mm, respectively.

The horizontal axis represents a thickness of the rear cover 24 and the vertical axis represents the voltage value converted corresponding to the intensity of the magnetic flux density of the second magnet 30B. The voltage value may be obtained by multiplying the intensity of the magnetic flux density B2 by 5. For example, when the intensity of the magnetic flux density B2 of the second magnet 30B is equal to 30 G, the voltage value may be equal to 120 mV.

The reference numeral A1 in FIG. 13 represents a preferable voltage value of 200 mV required in the standard, and the reference numeral A2 represents a recommended voltage value of 160 mV required in the standard. The second magnet 30B may have the intensity of the magnetic flux density of 40 G in order to obtain the preferable voltage value of 200 mV, and the second magnet 30B may have the intensity of the magnetic flux density B2 of 32 G in order to obtain the recommended voltage value of 160 mV. The recommended voltage value may be the minimum value at which any errors do not occur even when the recommended voltage value is applied to a product such as a terminal so that a user can safely use the terminal. The preferable voltage value may be the maximum value which guarantees the best quality.

There is a need to dispose the second magnet 30B to allow the voltage value to be equal to or greater than the recommended voltage value (160 mV) in order to meet the standard.

As shown in FIG. 13, when the thickness of the rear cover 24 was in the range of 0.5 mm to 0.8 mm, the intensity of the magnetic flux density B2 of the second magnet 30B was beyond 160 mm.

In addition, when the thickness of the rear cover 24 was in the range of 0.5 mm to 0.7 mm and the diameter of the second magnet 30B was in the range of 8 mm to 12 mm, the intensity of the magnetic flux density B2 of the second magnet 30B was beyond 160 mm.

When the thickness of the rear cover 24 was equal to 0.8 mm and the diameter of the second magnet 30B was in the range of 9 mm to 12 mm, the intensity of the magnetic flux density B2 of the second magnet 30B was beyond 160 mm. However, when the diameter of the second magnet 30B was equal to 8 mm, the intensity of the magnetic flux density B2 of the second magnet 30B was equal to or less than 160 mm.

If the diameter of the second magnet 30B is equal to or more than 12 mm, the intensity of the magnetic flux density B2 of the second magnet 30B may be more increased. However, as the diameter of the second magnet 30B is increased, the power reception efficiency may be deteriorated. That is, in order to improve the power reception efficiency, the power transmitted from the holder 10 must be effectively received. However, although the magnetic flux density is increased when the diameter of the second magnet 30B is increased, the increased magnetic flux density prevents the reception coil 32B of the terminal from generating current, so that the terminal 20 may not effectively receive the power from the holder 10.

Thus, if the power reception efficiency of the terminal 20 is ensured, the diameter of the second magnet 30B may be equal to or more than 120 mm. Even in this case, the maximum diameter of the second magnet 30B cannot exceed a diameter obtained based on the available area. For example, when the available area is equal to 130 mm2, since the available area is equal to 3.14r2, the radius r is equal to 6.43 mm, the diameter D of the available area may be equal to 2r, that is, 12.86 mm.

If the power reception efficiency of the terminal 20 is not ensured, it is preferable to set the diameter of the second magnet 30B to be equal to or less than 12 mm.

Meanwhile, table 2 shows an arrangement standard of the second magnet 30A in the winding coil structure.

TABLE 2

| Sample | Rear cover 24 Thickness [mm] | Diameter/area of second magnet 30A [mm/mm²] | Ratio of area of second magnet 30A to available area [%] |
| --- | --- | --- | --- |
| #1 | 0.5 | 8/50 | 22 |
| #2 | 0.6 | 8/50 | 22 |
| #3 | 0.7 | 8/50 | 22 |
| #4 | 0.8 | 9/64 | 28 |
| #5 | 0.5 | 11/95 | 42 |
| #6 | 0.6 | 11/95 | 42 |
| #7 | 0.7 | 12/113 | 50 |
| #8 | 0.8 | 12/113 | 50 |

As shown in table 2, the arrangement standard of the second magnet 30A in the winding coil structure is the same as that of the second magnet 30B in the lead frame coil structure. Only, as described above, since the winding coil 32A has no pads, there do not exist any pads in the central region of the winding coil 32A. Thus, the central region of the winding coil 32A may be utilized as an arrangement space only for the second magnet 30A. Therefore, the entire central area of the winding coil 32A may become an available area. So, the ratio of the area of the second magnet 30A to the available area in the winding coil structure may be less than that in the lead frame coil structure. For example, as shown in table 1, while the ratio of the area of the second magnet 30B to the available area in the lead frame coil structure is in the range of 44% to 100%, the ratio of the area of the second magnet 30A to the available area in the winding coil structure is in the range of 22% to 50%.

Although experiment data about the intensity of the magnetic flux density of the second magnet 30A in the winding coil structure based on table 2 are not shown, it may be sufficiently expected that the intensity of the magnetic flux density B2 of the second magnet 30A in the winding coil structure has a tendency similar to that of the intensity of the magnetic flux density B2 of the second magnet 30B in the lead frame structure.

A method according to the embodiment may be prepared as a program executable by a computer and stored in computer-readable recording media. The computer-readable recording media include a ROM, a RAM, a CD-ROM, a magnetic table, a floppy disk, and an optical data storing device, and include a device realized in the form of a carrier wave (for example, transmission over the Internet).

The computer-readable recording media are distributed into computer systems connected to each other through a network to store computer-readable codes through a distribution scheme so that the computer-readable codes may be executed. In addition, function programs, codes, and code segments used to realize the method can be easily deduced by programmers in the art to which the disclosure pertains.

The embodiment provides a wireless power receiver and a terminal of which the costs are reduced.

The embodiment provides a wireless power receiver and a terminal which include a magnet disposed to meet the requirements required by the standard.

The embodiment provides a wireless power receiver and a terminal which include a magnet optimally disposed to be enough to sense a wireless power transmitter or a holder even when a bottom cover has a thick thickness.

According to an embodiment, there is provided a wireless power receiver which includes a coil to receive the power; and a magnet to generate an intensity of a magnetic flux density sensed by a sensor of the wireless power transmitter. The coil has an empty central region. The magnet is disposed in the empty central region of the coil. The magnet includes an electric steel sheet According to an embodiment, there is provided a terminal for wirelessly receiving power from a holder. The terminal includes a cover facing the holder; a coil disposed on the cover to receive the power; and a magnet to generate an intensity of a magnetic flux density sensed by a sensor of the holder, wherein the magnet is surrounded with the coil, disposed in a central region of the coil, and includes an electric steel sheet.

The embodiments have the following effects.

First, an inexpensive electrical sheet is used for the magnet provided to the terminal so that the unit price of a product may be reduced.

Second, the magnet provided to the terminal is optimally disposed so that the magnet meets the intensity of magnetic flux density defined in the standard.

Thirdly, the diameter of the magnet and the thickness of the bottom cover, which are provided to the terminal, are optimized so that the possibility of an error occurring in the determination whether the holder approaches the terminal.

Meanwhile, any other various effects will be directly and implicitly described below in the description of the embodiment.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A wireless power receiver for wirelessly receiving power from a wireless power transmitter, the wireless power receiver comprising:
    a coil to receive the power;
    an electric steel sheet to generate an intensity of a magnetic flux density sensed by a sensor of the wireless power transmitter;
    a shielding member disposed on an upper surface of the coil and an upper surface of the electric steel sheet; and
    a printed circuit board disposed on the shielding member, wherein electronic components including a power source, an AC power generating unit, and a control unit are mounted on the printed circuit board,
    wherein the coil has an empty central region,
    wherein the electric steel sheet is disposed in the empty central region of the coil,
    wherein the coil and the electric steel sheet are disposed on a same surface,
    wherein the coil surrounds the electric steel sheet, and
    wherein the coil and the electric steel sheet are adhered to a back surface of the shielding member by an adhesive.

2. The wireless power receiver of claim 1, wherein the intensity of the magnetic flux density is equal to or greater than 32 Gauss.

3. The wireless power receiver of claim 1, wherein the electric steel sheet contains silicon (Si) in a range of 1% to 5%.

4. The wireless power receiver of claim 1, wherein the electric steel sheet has a diameter in a range of 8 mm to 12 mm.

5. The wireless power receiver of claim 1, wherein the shielding member is between the upper surface of the electric steel sheet and the printed circuit board.

6. A terminal for wirelessly receiving power from a holder, the terminal comprising:
    a cover facing the holder;
    a coil disposed on the cover to receive the power;
    an electric steel sheet to generate an intensity of a magnetic flux density sensed by a sensor of the holder;
    a shielding member disposed an upper surface of the coil and an upper surface of the electric steel sheet; and
    a printed circuit board disposed on the shielding member, wherein electronic components including a power source, an AC power generating unit, and a control unit are mounted on the printed circuit board,
    wherein the electric steel sheet is surrounded with the coil, disposed in a central region of the coil,
    wherein the coil and the electric steel sheet are disposed on a same surface, and
    wherein the coil and the electric steel sheet are adhered to a back surface of the shielding member by an adhesive.

7. The terminal of claim 6, wherein the intensity of the magnetic flux density of the electric steel sheet is equal to or greater than 32 Gauss.

8. The terminal of claim 6, wherein the electric steel sheet contains silicon (Si) in a range of 1% to 5%.

9. The terminal of claim 6, wherein the cover has a thickness in a range of 0.5 mm to 0.8 mm.

10. The terminal of claim 6, wherein the electric steel sheet has a diameter in a range of 8 mm to 12 mm.

11. The terminal of claim 6, wherein the coil includes one of a winding coil structure and a lead frame coil structure.

12. A wireless power transmitter comprising:
    a power source;
    an AC power generating unit to receive power from the power source to generate AC power;
    a transmission coil to transmit the AC power generated from the AC power generating unit to a wireless power receiver;
    a first magnet in a central region of the transmission coil;
    a sensor to provide a first voltage signal corresponding to a magnetic flux density of the first magnet and a second voltage signal corresponding to the magnetic flux density of the first magnet and a magnetic flux density of a second magnet of the wireless power receiver; and
    a control unit that controls the transmission coil to transmit the AC power when a variation degree between the first and second voltage signals is equal to or greater than a threshold value.

13. The wireless power transmitter of claim 12, wherein the control unit receives electric signals corresponding to each of the magnetic flux densities of the electric steel sheet of the wireless power receiver and the first magnet sensed by the sensor.

14. The wireless power transmitter of claim 13, wherein the control unit is switched from a sleep mode to a wake-up mode in response to the electric signals.

15. The wireless power transmitter of claim 13, wherein the control unit controls the AC power generating unit in response to the electric signals.

16. The wireless power transmitter of claim 12, wherein an intensity of the magnetic flux density of the electric steel sheet is equal to or greater than 32 Gauss.

* * * * *